| United States Patent [19] | [11] 3,959,000 |
| --- | --- |
| Nakagawa et al. | [45] May 25, 1976 |

[54] HIGH STRENGTH GLASS MADE BY ION EXCHANGE

[75] Inventors: Kenji Nakagawa; Ko Itaya, both of Tokorozawa, Japan

[73] Assignee: Hoya Glass Works, Tokyo, Japan

[22] Filed: Apr. 30, 1974

[21] Appl. No.: 465,547

Related U.S. Application Data

[60] Division of Ser. No. 269,873, July 7, 1972, abandoned, which is a continuation-in-part of Ser. No. 20,176, March 17, 1970, abandoned.

[30] Foreign Application Priority Data

Mar. 27, 1969 Japan.............................. 44-23342

[52] U.S. Cl..................................... 106/52; 65/30 E
[51] Int. Cl.²..................... C03C 3/04; C03C 15/00
[58] Field of Search.................. 65/30, 30 E; 106/52

[56] References Cited
UNITED STATES PATENTS

| | | | |
| --- | --- | --- | --- |
| 2,779,136 | 1/1957 | Hood et al.......................... | 65/30 X |
| 3,357,876 | 12/1967 | Rinehart............................. | 65/30 E |
| 3,529,946 | 9/1970 | Fisher et al. ....................... | 65/30 E |
| 3,573,076 | 3/1971 | Rittler ................................. | 65/30 E |
| 3,597,179 | 8/1971 | Simmons............................. | 65/30 E |
| 3,615,320 | 10/1971 | Juhge et al. ........................ | 65/30 E |
| 3,656,923 | 3/1972 | Garfinkel ............................ | 65/30 E |

*Primary Examiner*—S. Leon Bashore
*Assistant Examiner*—Frank W. Miga
*Attorney, Agent, or Firm*—Cushman, Darby & Cushman

[57] ABSTRACT

A $SiO_2$-$Al_2O_3$-$Na_2O$-$Li_2O$ glass which can be strengthened in a short time, typically in less than about thirty minutes, by an alkali metal ion exchange method to produce a high strength glass having an improved compressive surface layer of relatively large thickness can be obtained by substituting $Li_2O$ for a portion of $Na_2O$ content in a glass consisting essentially of $SiO_2$, $Al_2O_3$, $Na_2O$, $Li_2O$ and $F_2$.

7 Claims, 1 Drawing Figure

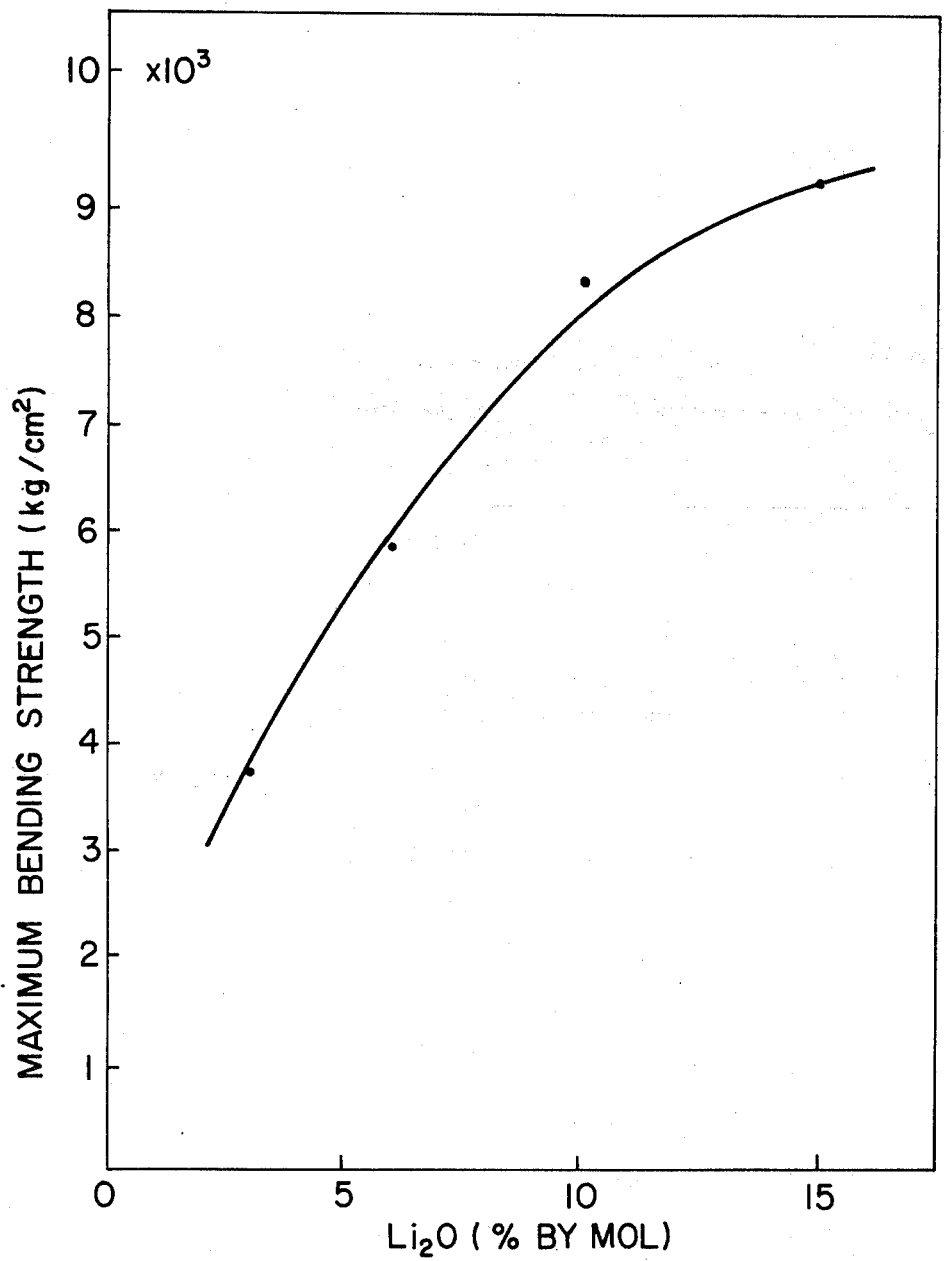

HIGH STRENGTH GLASS MADE BY ION EXCHANGE

This application is a division of application Ser. No. 269,873 filed July 7, 1927 now abandoned which is a continuation-in-part of Ser. No. 20,176 filed Mar. 17, 1970 now abandoned.

BACKGROUND OF THE INVENTION

The present invention relates to a process for producing a glass and a glass composition with a compressive surface layer having a high strength, and more particularly to a process for increasing the mechanical strength of alkali silicate glass by an ion exchange where the glass is contacted with a fused salt of an alkali metal ion having a larger ionic radius than that contained in the glass, so as to replace the alkali metal ion in the glass with the larger alkali metal ion. Hereinafter this will be referred to as an alkali metal ion exchange.

Methods for increasing the strength of glass are known where the alkali metal ion exchange is conducted at lower temperatures - that is, at the strain point or below - to produce a surface layer having a compressive strain in the glass. In most cases, however, the replacement of the smaller alkali metal ion in the glass with the larger alkali metal ion in the salts proceeds at an extremely low rate and requires a considerable time for attaining a satisfactory thickness of the compressive layer. In the cases of conventional soda-lime-silicate and lead-silicate glasses the treatment is required to be carried out over a period of about 10 hours. Even when such a long treatment has been conducted, the bending strength of the treated glass is only 3,000 - 4,500 kg/cm² and the depth of the formed compressive surface layer is scarcely ever more than 10μ; since the compressive layer formed is rather small in its thickness, as mentioned above, these types of glasses have disadvantage in that since the strength tends to be affected by fine flaws produced in the surface, the values thereof are distributed over a wide range, and that the strength is easily lowered due to fine surface scratches produced during customary handling after treatment. The degree of distribution of strength values as expressed by a ratio of a standard deviation to an average value of strength is referred to herein as a strength deviation. Conventional soda lime-silicate and lead-silicate glasses have strength deviation of 12 – 14% while alkali metal ion exchanged ones have much layer value (15 – 20%). Therefore, the glass of these types indicate unimpressive results by alkali metal exchange.

Although an attempt has been proposed in Japanese Pat. Publication No. 20629/66 for overcoming such disadvantage by increasing the rate of the alkali metal ion exchange using a glass having a high content of $ZnO_2$, this type of glass has a high viscosity at melting temperature and is poorly workable.

According to this patent the surface compression strain is produced by the difference of heat expansion coefficient between the surface and inner portions of the glass. In the case that crystals of low heat expanaion coefficient are educed in the surface portion, it causes a large difference of heat coefficient and a high strength glass is produced. However, this glass has a defect in that it is relatively readily devitrified in its surface portion. On the contrary, when crystals of low heat expansion coefficient are not educed in the surface portion, its strength is lower generally below 3000 kg/cm², as the difference in the thermal coefficient due to the alkaline ion exchange is small. Furthermore, this method has a disadvantage that glass articles are apt to be deformed during the ion exchange process because the ion exchange is perfomed at a higher temperature than the distortion point of the glass composition so treated.

A glass having a high rate with respect to the alkali metal ion exchange, for example, is described in the publication, "Physics and Chemistry of Glasses" Vol. 5, pp 123–129, which discloses that the $SiO_2 - Na_2O-Al_2O_3$ glass composition having a ratio, $Al_2O_3/Na_2O$, of 1 or more is suitable. However, this glass composition has disadvantages in that it also is too viscous for a conventional melting process.

As a glass having a low melting temperature with a good workability and yet treated at a relatively high rate of the alkali metal ion exchange, Japanese Pat. Publication No. 3632/68 discloses the $SiO_2$-RO(CaO or MgO)-$R_2O$($Li_2O$, $Na_2O$ or $K_2O$) glass composition having at least 50 mol % of MgO on the basis of the total amount of RO. Further, as a glass having similar features, Japanese Patent Publication No. 19420/68 discloses that the $R_2O$($Li_2O$, $Na_2O$ or $K_2O$)-MgO-$SiO_2$-$Al_2O_3$-$B_2O_3$ glass composition is suitable. These glasses have to be contacted with $KNO_3$ or $NaNO_3$ at high temperatures for 4-20 hours. This period of treatment time is still unsatisfactory, although it is much shorter than those in the cases of conventional soda-lime-silicate and lead-silicate glasses. Moreover, the treatment requires large apparatus when a great number of articles are treated, another disadvantage. Further, Japanese Patent Publication No. 26055/68 discloses that the $SiO_2$-$Al_2O_3$-$Na_2O$-$ZnO$-$F_2$ glass is treated at a high rate in the alkali metal ion exchange the resulting products have a markedly higher strength after the ion exchange treatment than those of conventional soda-lime-silicate and lead-silicate glasses strengthened in the same manner. Also the glass is said to have good working properties suitable for the conventional melting process. This glass is improved as compared with those of Japanese Pat. Publications Nos. 3632/68 and 19420/68 in that it can be sufficiently treated by dipping in a melt of $KNO_3$ at high temperatures even for much shorter times and has a high strength after the treatment. However, it is necessary that the glass be treated in $KNO_3$ for more than thirty minutes.

U.S. Pat. No. 2,779,136 to Hood discloses replacing $Na^+$ or $K^+$ with $Li^+$ in a surface layer of $SiO_2$-$Al_2O_3$-$Na_2O$ glass by dipping the glass in a lithium salt at a temperature between the strain point and the softening point of the glass. According to this patent, the strain is generated in the surface layer due to the difference in thermal expansion between the surface layer and the inner body portion of the glass. The alkali metal oxides included in the disclosed glass compositions are substantially $Na_2O$ and $K_2O$; $Li_2O$ is maintained at less than 1% by weight to prevent the production of β- spodumene in the glass. The working examples indicate that the amount of $Li_2O$ actually used is less than 0.2% in all instances.

According to this patent, the surface compression strain is produced by the difference of the heat expansion coefficient between the surface and inner portions of the glass.

In the case that crystals of low heat expansion coefficient are educed in the surface portion, it causes a large difference of heat coefficient and a high strength glass is produced. However, this glass has a defect that it is relatively readily devitrified in its surface portion.

To the contrary, when crystals low heat expansion coefficient are not educed in the surface portion, its strength is lower, generally below 3000 kg/cm² as the difference in the thermal coefficient due to the alkaline ion exchange is small.

Furthermore, this method has a disadvantage that glass articles are apt to be deformed during the ion exchanging process because the ion exchange is performed at a higher temperature than the distortion point. It has been found that such glass compositions cannot be suitably treated according to the present invention due to he $Li^+$ content suitable for replacement by $Na^+$ or $K^+$.

British Pat. 1,018,890 describes lithium-soda-alumina-silica glass that includes from 2 to 15% ZnO. Sodium fluoride is an optional ingredient and may also be present to the extent of not more than 1%, provided that al least 2% ZnO is also present. As is known in the art, lithium-soda-alumina-silica glass including a high ZnO content is apt to devitrify when the lithium content is increased.

Accordingly, when this glass is treated in the melted salt including sodium ion, a sufficiently high strength is not obtained of the glass. Furthermore, this glass has a high viscosity, and has a disadvantage that it is difficult to obtain homogeneous glass.

Therefore, many attempts have beem made for obtaining glasses which can be treated at a higher rate in the alkali metal ion exchange than in any of the aforementioned glasses, and which have a higher strength even after a short treatment time than any conventional treated soda-lime-silicate and lead-silicate glasses. Also, the compressive surface layer should be of a large thickness and the glass should not deviate so largely in strength from the average strength as to the standard deviation.

An object of the present invention is, therefore, to provide a glass which meets the above requirements.

DETAILED DESCRIPTION OF THE INVENTION

We have examined the effects of various oxides and $F_2$ on sodium alumino silicate glasses with respect to the viscosity at high temperature, speed of alkali ion exchange and strength of glasses after the treatment of alkali ion exchange As a result we have found that many oxides, including alkali metal oxides such as $K_2O$, divalent metal oxides such as PbO, BaO, CaO, ZnO and MgO and other oxides such as $B_2O_3$ and $TiO_2$, are all effective for lowering the viscosity of glasses at high temperature. At the same time, however, they show a relatively significant effect of lowering the speed of alkali ion exchange and the strength of glasses after the treatment of alkali ion exchange. In contrast to the above-mentioned oxides, $F_2$ shows a very impressive effect of lowering the viscosity of sodium alumino silicate glasses at high temperature, while it shows no substantial effect of lowering the speed of alkali ion exchange and of lowering the strength of glasses after the treatment of alkali ion exchange.

The effect of fluorine as compared with ZnO will be obtained in the following by way of an example. A glass having a composition by mol of 65% $SiO_2$, 13% $Al_2O_3$, 7% $Na_2O$, 9% $Li_2O$ and 3% ZnO at about 1550°C was melted. By soaking this glass in a bath of $Na_2O_3$ of 400°C for 20 minutes so as to exchange $Li^+$ ion in the glass by $Na^+$ ion in the bath, a glass having bending strength 7200 kg/cm² and 35μ thickness of compression layer was obtained.

A glass having a composition by mol of 65% $SiO_2$, 13% $Al_2O_3$, 7% $Na_2O$, 9% $Li_2O$, 3% MgO and 50% $AlF_3$ was melted at about 1480°C. This glass was soaked in a bath of $NaNO_3$ of 400°C for 20 minutes so as exchange $Li^+$ ion in the glass by $Na^+$ ion in the bath, whereby a glass having bending strength of 7400 kg/cm² and 45μ thickness of compression layer was obtained.

From these facts, we have found that the objects of the present invention can be accomplished by a glass having a composition which consists, on the oxide basis by mol, of 45 – 80% $SiO_2$, 4 – 20% $Al_2O_3$, 8 – 30% total of $Na_2O + Li_2O$, said $Li_2O$ being not more than 70% of the total of $Na_2O + Li_2O$, and 2 – 8% $F_2$, wherein the ratio of $(Li_2O + Na_2O)/Al_2O_3$ is 2/3 – 4/1 and the total of $SiO_2 + Al_2O_3 + Na_2O + Li_2O + F_2 \geq 90\%$. A glass as produced from the above composition can be extremely easily melted, formed and treated at a markedly higher rate in the alkali metal ion exchange. Further, even by a short treatment time of about 30 minutes or less, the glass will have a compressive surface layer if not less than 15μ thickness and bending strength approaching between 4,000 and 11,000 kg/cm² with a strength deviation of 10% or less. As a comparison, when conventional soda-lime-silicate and lead-silicate glasses are strengthened in the same treatment, they must be treated for about 15 hours. Further, after such a treatment, a compressive surface layer of not less than 15μ is scarcely formed therein and their strengths are only 3,000 – 4,500 kg/cm² with a deviation of 15 – 20% in most cases.

Further, we have found that fluorine in addition to acting as a flux also provides a thick and strong compression strain layer within a relatively short treating time, provided that the fluorine is present at least to the extent of 2%. This effect of improving the compression strain layer is not achieved with other known oxide fluxes such as $K_2O$, $B_2O_3$, CaO, BaO or PbO added to lithium-soda-alumina-silica glass as the ion exchange is heavily obstructed, thus increasing the requisite ion exchange time. It is to be noted that other halogens, chlorine and bromine, are not nearly so soluble in glass as is fluorine. Therefore, chlorine and bromine do not have the effect of decreasing the glass viscosity.

Glass compositions according to the present invention are treated in a bath of an alkali metal ion having a larger ionic radius than that of the glass. This treatment is conducted at a temperature at about the glass strain point or less. For the glass compositions of the present invention treatment temperatures of between about 300° and about 480°C are employed. Typical treatment baths are sodium or potassium nitrate or their mixture. When the glass according to the present invention is treated in a bath of melted $NaNO_3$, a compression strain layer of a high strength and deep thickness is obtained within a short time. In this case, it is desirous that the $LiO_2$ content in the untreated glass is more than 30% mol of the total of all the alkaline metallic oxides, because the strength of the glass after the treatment is markedly reduced if the content of $Li_2O$ in the untreated glass is small.

In the following, it is described in detail how the amount of $Li_2O$ in the untreated glass affects the strength and the thickness of the compression strain layer.

When a part of $Na_2O$ contained in the $SiO_2$-$Al_2O_3$-$Na_2O$ glass containing $F_2$ is substituted with $Li_2O$ in varying amounts to give glass compositions within the above range, the resulting effects will vary accordingly. The typical effect of $Li_2O$ content in the untreated glass on the strength of treated glass and the thickness of compressive surface layer are as follows. The maximum strength of treated glass in molten $NaNO_3$ increases with the $Li_2O$ content in the untreated glass and this value is in the range of about 4,000 – 11,000 kg/cm², depending upon $Li_2O$ content in the untreated glass. The thickness of the compressive surface layer formed in the glass having the maximum strength is about 25 – 50$\mu$. The treatment time required for obtaining the maximum strength is generally about 20 minutes or less. On the other hand, even where the same glasses are dipped in a melt of $KNO_3$ instead of $NaNO_3$, the treating time required for obtaining the maximum strength is shortened with the increase of the amount of $Li_2O$ contained in the untreated glass. However, the maximum value of strength of the glass treated in molten $KNO_3$ is nearly independent on the $Li_2O$ content in the untreated glass and this value is in the range about 7,000 – 8,000 kg/cm² with a formed compressive surface layer of 20 – 40$\mu$. The treating time required for obtaining the maximum strength is longer than that in molten $NaNO_3$ treatment and generally about 30 minutes or less.

Thus, according to the present invention, there is provided a novel glass composition consisting, on the oxide bases by mol of 45 – 80% $SiO_2$, 4 – 20% $Al_2O_3$, 8 – 30% total of $Na_2O$ + $Li_2O$, said $Li_2O$ being not more than 70%, preferably 30 to 70%, of the total of $Na_2O$ + $Li_2O$, 2 – 8% $F_2$, wherein the ratio of ($Li_2O$ + $Na_2O$)/$Al_2O_3$ is from 2:3 to 4:1 and the total of $SiO_2$ + $Al_2O_3$ + $Na_2O$ + $Li_2O$ + $F_2$ is 90% or more.

The reasons for the compositional limits on the above components are as follows. If $SiO_2$ is below 45%, the glass is apt to devitrify, the difficult to form and shows a degradation of chemical durability. If it is about 80%, the viscosity of the glass becomes too high to conveniently melt and form. With $Al_2O_3$ of more than 20%, and/or the sum of $Na_2O$ + $Li_2O$ lower than 8%, it is difficult to melt and form the glass due to a high viscosity. When $Al_2O_3$ is lower than 4%, the strength is not sufficiently increased. When the sum of $Na_2O$ + $Li_2O$ is more than 30%, the glass is undesirably deteriorated in its chemical durability. Although the increase of the proportion of $Li_2O$ in the total of $Na_2O$ + $Li_2O$ results in an increase in the rate of the alkali metal ion exchange to produce a glass having a high strength by a treatment for a short time, if $Li_2O$ is more than 70% of the total of $Na_2O$ + $Li_2O$, most glasses undesirably tend to devitrify. If the ratio of ($Li_2O$ + $Na_2O$)/$Al_2O_3$ is higher than 4:1, the rate of the alkali metal ion exchange decreases so that the treatment must be continued for a prolonged time, and moreover, the resulting strength is undesirably low. On the other hand, if the ratio is lower than 2:3, melting of the glass is difficult due to increase of the viscosity. With $F_2$ less than 2%, the glass viscosity is too high for the conventional melting process. If the $F_2$ content is above 8%, its vaporization rate during melting is too great to obtain a homogeneous glass; simultaneously the produced glass tends to divitrify with difficulty of forming, and the rate of the alkali metal ion exchange is lowered to a great extent, often exceeding 30 minutes for obtaining maximum strength. Therefore, the $F_2$ content preferably is not higher than 8%.

In order to improve the working properties of the glass suitable for the conventional melting process, chemical durability and coloration of glasses, other metal oxides such as MgO, PbO, CdO, CaO, $B_2O_3$, $TiO_2$ and $ZrO_2$ may be incorporated in the range of 10% or less. More than 10% of these oxides reduces undesirably the rate of the alkali metal ion exchange. Although $K_2O$ may be used instead of a portion of $Na_2O$ content so as to provide the working properties of glass, the $K_2O$ content more than 4% is not preferred as the rate of the alkali metal ion exchange becomes lower and the strength also is reduced.

As the glass produced from a composition including the constituents in the above-defined compositional ranges has a relatively low viscosity, it can be melted at a temperature of 1,450 – 1,550°C similar to conventional soda-lime-silicate glass, and furthermore, it has good workability. It can be subjected to the alkali metal ion exchange wherein a portion of the alkali metal ion contained therein is replaced with an alkali metal ion having a larger ionic radius by contacting it with a fused salt of the alkali metal, so that a compressive surface layer is formed to enhance the glass strength. In the case of a glass having a low content of $Li_2O$, the use of potassium salts desirably results in a higher strength than the use of sodium salts. On the other hand, in the case of a glass having a high content of $Li_2O$, a sodium or potassium salt or their mixture may be used.

The type of useful alkali metal salts is not critical. However, the nitrates of alkali metal are desirable because of their being melted below the strain point of the glass. Further, besides nitrates, there may be employed sulfates, sulfites, bisulfates, halides and the mixtures thereof. There may be added to such salts other metal salts such as salts of lead, calcium and copper. The term "alkali metal salt" referred to here includes the above mixtures.

The glass produced from a composition as defined above may be dipped in a bath of the alkali metal salt at high temperatures, or coated with the salt and then heated, or the hot glass may be subjected to a spray with the above alkali metal salts. By contacting the glass with the alkali metal salts at high temperatures as mentioned above, the alkali metal ion in the glass is easily replaced with an alkali metal ion of larger radius.

If the temperature in contacting the glass with the alkali metal salts is lower, the rate of the alkali metal ion exchange is reduced, while when it is too high, a release of strain takes place to lower the strength. Therefore, the ion exchange treatment should preferably be carried out at about the glass strain point or slightly lower. Although the glass strain point will vary in some instances, the glass useful in the present invention is suitably treated at a temperature of about 300° to about 480°C. When the glass having a high content of $Li_2O$ is treated with potassium salts, the glasses may be preferably treated at higher temperatures by 30 – 50°C than those with sodium salts increasing the upper limit to about 530°C. This is because the rate of the alkali metal ion exchange is somewhat lower than that in the treatment of sodium salts.

At the above temperatures the treatment for 10 – 30 minutes results in the formation of a compressive surface layer having a thickness of 15–35$\mu$ in the glass with a bending strength of 4,000 – 11,000 kg/cm². In this case the deviation of strength is 10% or less. Further, the degree of a reduction of the strength owing to fine flaws produced in the surface during subsequent ordinary handling is negligible. On the contrary, when conventional soda-lime-silicate glass or lead-silicate glass is treated in the same manner, the resulting compressive surface layer in most cases does not have a depth more than $10\mu$ even with the treatment lasting for about 15 hours. Also, the bending strength is only 3,000 – 4,500 kg/cm² with the deviation of 15–20%. In these sorts of glasses, since the formed compressive surface layer is thin, the strength is markedly reduced due to fine flaws produced in the surface during ordinary handling. The attached Figure is a characteristic curve displaying the maximum bending strength in kg/cm² plotted against the content of $Li_2O$ in mol %.

The present invention will be further illustrated by the following non-limiting examples in which all parts and percentages are by mol, unless otherwise indicated. As used herein, bending strength was measured with a polished plate of the particular glass composition, the plate having a thickness of 3mm, a width of 6mm and 60mm in length.

EXAMPLE 1

A glass was produced from a composition consisting of by mol, 47.8% $SiO_2$, 14.0% $Al_2O_3$, 12.1% $Na_2O$, 16.1% $Li_2O$, 6.0% ZnO, 2% MgO and 0.3% $As_2O_3$ by melting in a crucible at a temperature of from 1500 to 1550°C for about 4 hours. After firing, the molten glass was cast onto a steel mold to form plates. The plates were then annealed. Then, the plates were ground and polished to a thickness of 3mm. These polished plates were treated in a melt of $NaNO_3$ at a temperature of 360°C. The treatment lasting for 15 minutes resulted in the maximum bending strength of 8,700 kg/cm², compressive surface layer of $26\mu$ thick and a deviation of strength of about 8%. On the other hand, the untreated original glass had a bending strength of 2,200 kg/cm² and its deviation was about 13%.

EXAMPLE 2

Glass plates were produced according to the method described in Example 1 above from a composition consisting of, by mol, 63.0% $SiO_2$, 11.5% $Al_2O_3$, 9.0% $Na_2O$, 9.0% $Li_2O$, 7.5% $F_2$, and 0.3% $As_2O_3$. The glass plates were formed and were treated in a bath of $NaNO_3$ at a temperature of 420°C. A maximum bending strength of 6,800 kg/cm² was found for the plate treated for 15 minutes and the compressive surface layer was of $21\mu$. The deviation of strength was about 9%. The untreated glass plate had a bending strength of 2,000 kg/cm² with the deviation of about 15%.

EXAMPLE 3

Glass plates were produced by the same method described in Example 1 from a composition consisting, on the oxide basis, by mol, of 62.3% $SiO_2$, 8.1% $Al_2O_3$, 5.7% $Na_2O$, 13.5% $Li_2O$, 4.0% MgO, 4.8% $F_2$, 0.4% $TiO_2$, 0.9% $B_2O_3$ and 0.3% $As_2O_3$. The plates were made and were treated in a bath of $NaNO_3$ at a temperature of 370°C. The maximum bending strength of 6,600 kg/cm² was obtained by the treatment for 10 minutes and the compressive surface layer at the time was $24\mu$ thick. The deviation of strength was about 7%. The untreated original glass had a bending strength of 2,300 kg/cm² with the deviation of about 14%.

EXAMPLE 4

A glass produced from the same composition as in Example 3 was dipped in a bath of $KNO_3$ at a temperature of 440°C. The bending strength increased reaching its maximum of 7,700 kg/cm² when the treatment was for 20 minutes. The compressive surface layer was of $23\mu$ and the deviation of the strength was about 8%.

EXAMPLES 5 – 7

The glass plates produced by the same method described in Example 1 from compositions consisting, on the oxide basis, of constituents as indicated in the following table were treated in a bath of $NaNO_3$ maintained at a temperature of 380°C. The maximum bending strength and the thickness of the compressive surface layer formed were determined at the time when the bending strength reached its maximum. The results are shown in the following table.

| | | 5 | 6 | 7 |
|---|---|---|---|---|
| Composition (% by mol) | $SiO_2$ | 60.5 | 76.6 | 59.8 |
| | $Al_2O_3$ | 8.5 | 4.4 | 8.4 |
| | $Na_2O$ | 5.7 | 5.5 | 5.7 |
| | $Li_2O$ | 13.5 | 12.9 | 13.3 |
| | ZnO | — | — | 1.0 |
| | MgO | 6.9 | — | 4.0 |
| | $F_2$ | 4.6 | 4.5 | 6.6 |
| | $B_2O_3$ | — | — | 0.9 |
| | $As_2O_3$ | 0.3 | — | 0.3 |
| Treating Time (minutes) | | 10 | 20 | 20 |
| Maximum Bending Strength (kg/cm²) | | 8,600 | 4,380 | 10,000 |
| Thickness of Compressive Layer ($\mu$) | | 28 | 25 | 25 |

EXAMPLES 8 – 10

Various glass plates produced by the same method described in Example 1 from glass forming compositions consisting, on the oxide basis, of constituents as indicated in the following table were treated in a bath of $NaNO_3$ maintained at a temperature of 400°C. The maximum bending strength and the thickness of the compressive surface layer formed were determined at the time when the bending strength reached its maximum.

| | | 8 | 9 | 10 |
|---|---|---|---|---|
| Composition (% by mol) | $SiO_2$ | 59.8 | 69.2 | 57.3 |
| | $Al_2O_3$ | 9.4 | 9.5 | 14.9 |
| | $Na_2O$ | 9.5 | 4.3 | 4.1 |
| | $Li_2O$ | 9.5 | 10.0 | 9.7 |
| | ZnO | 2.0 | — | 1.5 |
| | $F_2$ | 7.8 | 3.0 | 4.0 |
| | MgO | — | — | 3.5 |
| | CdO | — | 2.0 | 2.0 |
| | PbO | — | — | 1.0 |
| | $B_2O_3$ | — | 2.0 | 1.0 |
| | $ZrO_2$ | 2.0 | — | — |
| | $K_2O$ | — | — | 1.0 |
| | $As_2O_3$ | — | 0.3 | 0.3 |
| Treating Time (minutes) | | 20 | 15 | 20 |
| Maximum Bending Strength (kg/cm²) | | 8,200 | 8,700 | 10,800 |
| Thickness of Compressive Layer ($\mu$) | | 67 | 30 | 33 |

The glass according to the present invention has good working properties suitable for conventional melting processes. Further, when contacted with potassium and/or sodium salts for a short time at high temperatures, a thick compressive surface layer can be formed and a stable high strength glass can be easily obtained. The glass according to the present invention does not deform during the strengthening treatment and it is conveniently processed by cutting or perforating even after the treatment. Therefore, it is suitable for use in window glasses, precision instruments, industrial materials requiring a high strength, and eyeglass and the like.

We claim:

1. In a process for producing a high strength glass comprising the steps of:
    a. providing a glass from a composition consisting essentially, on the oxide basis by mol%, of:
       47.8 to 76.6 $SiO_2$, 4.4–14.9 $Al_2O_3$, 4.1 – 12.1 $Na_2O_3$, 9 – 16.1 $Li_2O$, 0 – 6% ZnO and 0 – 6.9% MgO;
    b. contacting the glass of step (a) at a temperature of about the glass strain point or less with an alkali metal salt having a larger ionic radius alkali ion than that in said glass composition to affect ion exchange, the improvement of reducing the contacting time of step (b) to a period of about 10 – 30 minutes while at the same time improving the compressive strength of the resulting treated product without divitrification, comprising introducing into glass composition (a) from 2 – 7.8 $F_2$, such that the sum of $SiO_2$+ $Al_2O_3$ + $Na_2O$ + $Li_2O$ + ZnO + Mgo + $F_2$ is at least 90%, thus producing a high strength glass having a compressive surface layer of 21 – 67 microns in thickness and a bending strength between about 4,380 and 10,800 $kg/cm^2$.

2. Process as claimed in claim 1, wherein sodium salt is used as alkali metal salt.

3. Process as claimed in claim 1, wherein the alkali metal is a nitrate, sulfate, sulfite, bisulfite, halogen or mixture thereof.

4. Process as claimed in claim 1, wherein step (b) is conducted in a bath of potassium nitrate.

5. Process as claimed in claim 1, wherein step (b) is conducted in a bath of sodium nitrate.

6. Process as claimed in claim 1, wherein step (b) is conducted in a bath of a mixture of potassium nitrate and sodium nitrate.

7. The produce produced by the process of claim 1.

* * * * *